UNITED STATES PATENT OFFICE.

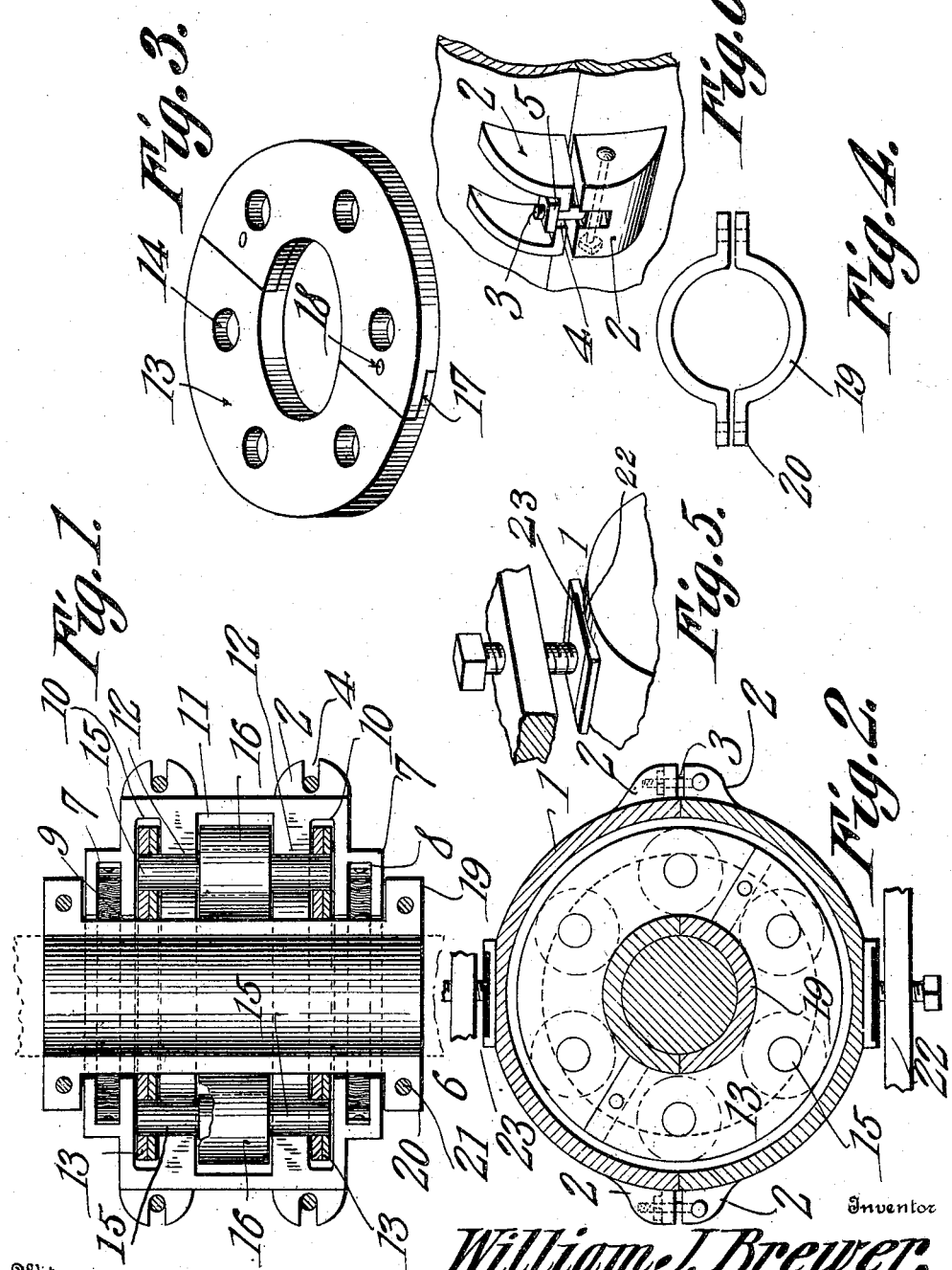

WILLIAM J. BREWER, OF TROY, NEW YORK.

ROLLER-BEARING.

983,807.

Specification of Letters Patent.    Patented Feb. 7, 1911.

Application filed January 6, 1910.   Serial No. 536,636.

*To all whom it may concern:*

Be it known that I, WILLIAM J. BREWER, a subject of the King of England, residing at Troy, in the county of Rensselaer and State of New York, have invented a new and useful Roller-Bearing, of which the following is a specification.

This invention relates to roller bearings, and has for its object the provision of a roller bearing which may be readily and cheaply constructed and in which the parts may be easily assembled upon the shaft to which it is applied without slipping any part over either end thereof.

With these objects in view, the invention consists in certain novel features of the device illustrated in the accompanying drawing, all of which will be hereinafter first fully described and then more particularly pointed out in the appended claims.

In the drawings,—Figure 1 is a plan view of the lower half of a roller bearing embodying my improvements. Fig. 2 is an end view of the same partly in section. Fig. 3 is a detail perspective view of a spacing ring by which the rollers are carried. Fig. 4 is a detail end view of a bushing which serves as a track to prevent the rollers wearing away or cutting into the shaft. Fig. 5 is a detail view of a part of the supporting devices. Fig. 6 is a detail view of the fastening for the members of the housing.

In carrying out my present invention, I employ a housing 1 which consists of two semi-cylindrical members, provided on their outer sides at their meeting edges with projections or lugs 2, forming parts of clamps for uniting the members. The lugs on one member have pivotally attached thereto a fastening bolt 3 which is adapted to swing into a notch 4 in the lug on the meeting member and this bolt is provided with a nut 5 at its free end which will pass over the said lug so that when the nut is turned home the fastening bolt 3 will be securely held within the notch 4 and the two members of the housing firmly clamped together. The assembled members of the housing are provided in their ends with cylindrical opening through which the shaft, indicated in dotted lines at 6, passes loosely and on the outer face of each end I provide a recessed or grooved projection 7 within which is fitted a leaf spring 8 and a felt or similar washer 9 which will partly cover the opening in the end of the housing and thereby prevent the entrance of sand or other foreign matter into the housing so that the bearing will be kept clean and free from substances which would tend to wear away the same. Interiorly the housing is formed with channels 10 near its ends and the large intermediate channel 11, as clearly shown in Fig. 1, two annular tracks 12 being thereby provided between the channels. Within the outer channels 10 I place the spacing rings 13 which are provided with openings 14 to receive the ends of the axles 15 carrying the rollers 16, the said rollers 16 rotating about the axles and running free in the channels 11. The spacing rings 13 in two members having their ends shaped to overlap and form a joint 17, through which extends an opening 18, a suitable fastening bolt being inserted through the said opening 18 and extending across the housing to the opposite side of the same so as to secure the members of the ring together and also hold the two rings in their proper spaced relation. The rollers 16, as before stated, are adapted to rotate freely on the axles 15 and the central portions of the axles are of a slightly greater diameter than the end portions 15 of the same so that if the roller should become loose, the central portion of the axle thereof would prevent lateral movement by reason of its engagement with the sides of the channel 11. To prevent wearing and cutting of the surface of the shaft I employ a wear bushing 19 against which rollers 16 bear. This bushing is constructed of two similar semi-cylindrical members provided at their ends with outstanding lugs 20 through which suitable fastening bolts 21 are inserted to firmly clamp the said bushing around the shaft, as will be readily understood. As shown in Fig. 4, the lugs 20 are slightly spaced apart so that there will be ample space to permit the securing bolts to draw the members together so closely around the shaft that movement of the bushing independent of the shaft will be prevented. For the same reason, a slight space is left between the lugs 2 on the members of the housing, as will be readily understood.

In order that vibration may be absorbed and the effects of the same thereby minimized, I employ a cushion 22 which may be of rubber or any other suitable material and is carried by brackets or lugs 23 on the ends of the housing through which the fastening bolts are passed. I thus overcome the jar and concussion which has heretofore been caused by contact of the main body and the screws employed to retain the main body in any desired position.

The bushing having been clamped around the shaft, the rollers are fitted upon their respective axles and the ends of the axles engaged in the openings 14 in the spacing rings 13 and the members of the rings are then fitted to the bushing from opposite sides of the same, after which the fastening bolts are inserted so as to secure the members of the rings together and also hold the rings in the proper spaced relation. The rollers will thus be quickly assembled around the shaft and may be quickly inclosed by bringing the members of the housing together around the bushing, as will be readily understood.

It will be observed that the shape of the housing or box provides compartments to accommodate the separator rings so that they will be maintained in their proper relation and lubricating material may be held within the housing so as to reach the bearing rollers readily and constantly.

The rollers may be all made to a standard size and fitted to a shaft of any diameter by providing a number of bushings of different thicknesses so that the space between the rollers and the shaft may be readily and completely taken up by a bushing having walls of the necessary thickness.

The construction, while simple, is such that the parts may be very easily and quickly assembled by an unskilled workman and when so assembled will furnish a steady and easy running bearing for the shaft.

Having thus described my invention, what I claim is:

1. The combination of a shaft, a surrounding housing provided with three internal channels and two interposed tracks, rings mounted in the outer channels, axles carried by and extending between the said rings and traveling on said tracks, and rollers mounted on the said axles to support the shaft and running free in the intermediate channel of the housing.

2. In a roller bearing, the combination of a housing provided with three internal channels with interposed tracks, rings mounted in the outer channels, axles carried by and extending between the said rings and having their central portions slightly enlarged and extending into the central channel, against the adjacent faces of said tracks, and rollers mounted on the said axles and running free in said central channel.

3. A roller bearing comprising a housing of two semi-cylindrical members, means for clamping them together, and grooved projections at the ends of the members for receiving a dust guard; combined with the shaft, a two-part bushing longer than said housing and its projections, means at the ends of the parts for clamping them around the shaft, spacing rings in two members each, means for connecting said members, and a series of rollers between the housing and bushing having axles mounted in said rings, the rollers rotating freely on the axles.

4. In a roller bearing, the combination with a two part housing provided with three internal channels with interposed tracks and with grooved projections at its ends, dust guards within the grooves of the projections, and means for holding the parts together; of a shaft extending axially through the housing, spacing rings mounted in the outer channels of the housing, axles carried by and extending between said rings and having their centers enlarged between the tracks and resting against the adjacent faces thereof, and rollers mounted loosely on the enlarged portions so as to run free in the central channel and receive the weight of the shaft.

5. In a roller bearing, the combination with a two part housing provided with three internal channels with interposed tracks and with grooved projections at its ends, dust guards within the grooves of the projections, and means for holding the parts together; of a shaft extending axially through the housing, a two part bushing longer than said housing and its projections, means at the ends of the parts for clamping them around the shaft, spacing rings mounted in the outer channels of the housing, axles carried by and extending between said rings and having their centers enlarged between the tracks and resting against the adjacent faces thereof, and rollers mounted loosely on the enlarged portions so as to run free in the central channel and bear against said bushing and receive the weight of the shaft.

In testimony that I claim the foregoing as my own, I have hereto affixed my signature in the presence of two witnesses.

WILLIAM J. BREWER.

Witnesses:
  B. M. TOLHURST,
  J. F. JESSEN.